United States Patent [19]
Redfield

[11] Patent Number: 5,621,549
[45] Date of Patent: Apr. 15, 1997

[54] METHOD AND APPARATUS FOR POSITIONING A LIGHT BEAM ON A HOLOGRAPHIC MEDIA

[75] Inventor: Stephen R. Redfield, Austin, Tex.

[73] Assignee: Tamarack Storage Devices, Inc., Santa Fe, N.M.

[21] Appl. No.: 517,462

[22] Filed: Aug. 21, 1995

Related U.S. Application Data

[63] Continuation of Ser. No. 134,925, Oct. 7, 1993, abandoned.
[51] Int. Cl.⁶ .......................... G02B 11/26; G02B 11/28
[52] U.S. Cl. ............................................. 359/24; 359/22
[58] Field of Search .................................. 365/215, 216, 365/234; 359/22, 25, 21, 24, 26

[56] References Cited

U.S. PATENT DOCUMENTS

| | | |
|---|---|---|
| 3,407,405 | 10/1968 | Hoadley . |
| 3,408,656 | 11/1968 | Lamberts . |
| 3,556,628 | 1/1971 | Burckhardt .................. 359/24 |
| 3,567,305 | 3/1971 | Collier et al. ................ 359/11 |
| 3,635,538 | 1/1972 | Caulfield et al. . |
| 3,697,149 | 10/1972 | Van Heeckeren et al. ........ 359/26 |
| 3,751,132 | 8/1973 | Crow ............................ 359/24 |
| 3,761,155 | 9/1973 | Lo et al. ....................... 359/25 |
| 3,805,275 | 4/1974 | Kienle et al. .................. 359/26 |
| 3,820,869 | 6/1974 | Bolosset et al. ............... 359/24 |
| 3,838,903 | 10/1974 | Leith et al. ................... 359/26 |
| 3,888,561 | 6/1975 | Kurtz ............................ 359/26 |
| 3,891,976 | 6/1975 | Carlsen ......................... 359/21 |
| 3,912,391 | 10/1975 | Fleisher et al. . |
| 3,915,551 | 10/1975 | Silverman et al. ............. 359/26 |
| 3,976,354 | 8/1976 | Braitberg et al. .............. 359/21 |
| 4,063,795 | 12/1977 | Hiugnard et al. . |
| 4,076,370 | 2/1978 | Wako . |
| 4,213,193 | 7/1980 | Reid et al. . |
| 4,224,480 | 9/1980 | Satoh et al. ................. 369/44.42 |
| 4,307,165 | 12/1981 | Blazey et al. . |
| 4,334,007 | 6/1982 | Tinet et al. . |
| 4,362,806 | 12/1982 | Whitmore . |
| 4,621,351 | 11/1986 | Baer et al. .................. 369/44.25 |
| 4,636,027 | 1/1987 | Dube . |
| 4,687,720 | 8/1987 | Wreede et al. . |
| 4,799,746 | 1/1989 | Wreede . |
| 4,839,250 | 6/1989 | Cowan . |
| 4,983,003 | 1/1991 | Wreede et al. . |
| 5,007,690 | 4/1991 | Chern et al. . |
| 5,095,375 | 3/1992 | Bolt . |
| 5,098,176 | 3/1992 | Wolf ............................ 359/24 |
| 5,283,777 | 2/1994 | Tanno et al. .................. 359/24 |

*Primary Examiner*—Jon W. Henry
*Attorney, Agent, or Firm*—Gregory M. Howison

[57] ABSTRACT

An apparatus for positioning a data and reference beam onto the surface of a holographic storage media (10) includes a laser (16) for generating the reference beam, and a first reflecting surface (18) for positioning the output of the laser (16) along the y-axis. The beam is split into a data beam and a reference beam by a beam splitter (24) with the data beam directed toward an SLM (36) and the reference beam (26) directed toward an angle multiplexing reflective surface (40). The data beam during a record operation is reflected from the surface of the SLM (36) to a transform lens (34) and then to a column (35) on the surface of a holographic storage media (10). The reference beam is reflected from a reflective surface (40) at a predetermined angle determined by the position of the reflective surface (40) to an HOE (46) for redirection to the surface of the storage media (10) to interfere with the data beam. During a data reconstruction operation, only the reference beam is generated. This results in a reconstructed image being directed toward an imaging lens (52) and then to a detector (54).

12 Claims, 4 Drawing Sheets

METHOD AND APPARATUS FOR POSITIONING A LIGHT BEAM ON A HOLOGRAPHIC MEDIA

This application is a continuation of application Ser. No. 08/134,925, filed Oct. 7, 1993, now abandoned.

TECHNICAL FIELD OF THE INVENTION

The present invention pertains in general to holographic storage systems and, more particularly, to the apparatus for positioning the light beam onto the storage media for both a record and a playback operation.

CROSS-REFERENCE TO RELATED APPLICATION

This Application is related to U.S. patent application Ser. No. 08/091,311, filed Jul. 14, 1993, now U.S. Pat. No. 5,377,176, and entitled "Method and Apparatus for Isolating Data Storage Regions in a Thick Holographic Storage Media" (Atty. Dkt. No. TAMA-21,889), U.S. patent application Ser. No. 08/091,620, filed Jul. 14, 1993, now U.S. Pat. No. 5,477,347, and entitled "Method and Apparatus for Isolating Data Storage Regions in a Thin Holographic Storage Media" (Arty. Dkt. No. TAMA-21,817) and U.S. patent application Ser. No. 08/110,139, filed Aug. 20, 1993, now abandoned, and entitled "Method and Apparatus for Phase Encoding Data Storage Regions in a Thin Holographic Storage Media" (Atty. Dkt. No. TAMA-21,875).

BACKGROUND OF THE INVENTION

As the need for increased dam storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

One method for positioning the laser beam onto the storage media is to utilize a fixed optics system that selects a given storage location, such that both the reference beam and the data beam are focused onto the storage location. In order to select another storage location on a two-dimensional holographic media, the storage media can then be moved along its x- and y-axes. Alternatively, the optic system can be more complicated, such that the beams can be located to a particular region without the need to move the media itself. However, apparatus for achieving such movement are quite complex.

SUMMARY OF THE INVENTION

The present invention disclosed and claimed herein comprises a positioning system for positioning laser beams on the surface of a holographic storage media for the purpose of recording or reading out a hologram from a select storage region. The positioning system includes a first motive device for holding the holographic storage media and moving the surface thereof along a single direction in the plane of the surface. A first reflective surface is operable to reflect the laser beam to provide a once-redirected beam, the first reflective surface controlled by a second motive device. The second motive device rotates the first reflective surface about an axis on the surface thereof, the laser beam impinging upon the axis. A collimating device is operable to redirect the once-redirected beam in a substantially parallel configuration as a twice-redirected beam. The rotation of the first reflective surface causes the twice-redirected beam to move along the surface of the holographic storage media at an angle to the single direction.

In another aspect of the present invention, the first and second motive devices are operable to move in discrete steps. The collimating device is operable to redirect the once-redirected beam as the twice-redirected beam at an angle that is perpendicular to the single direction.

In a further aspect of the present invention, a beam splitter is provided that is operable to split a portion of the twice-redirected beam off into a data beam. The remaining portion of the twice-redirected beam comprises a reference beam for a holographic recording operation at the select storage region. An angle multiplexing device is provided for varying the angle of incidence of the reference beam on the surface of the media for the select storage region. The data beam is processed by a spatial light modulator to superimpose data thereon, and a second reflective surface is operable to redirect the data beam as a redirected data beam to impinge upon the surface of the holographic storage media at the select storage region to interfere with the reference beam during a record operation. A transform lens is operable to focus the redirected data beam onto the select storage region. A detector is provided during a playback operation for detecting data in a reconstructed image that is generated when an interference grating stored at the select storage region is illuminated by the reference beam under conditions corresponding to the position and angle of the reference beam.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
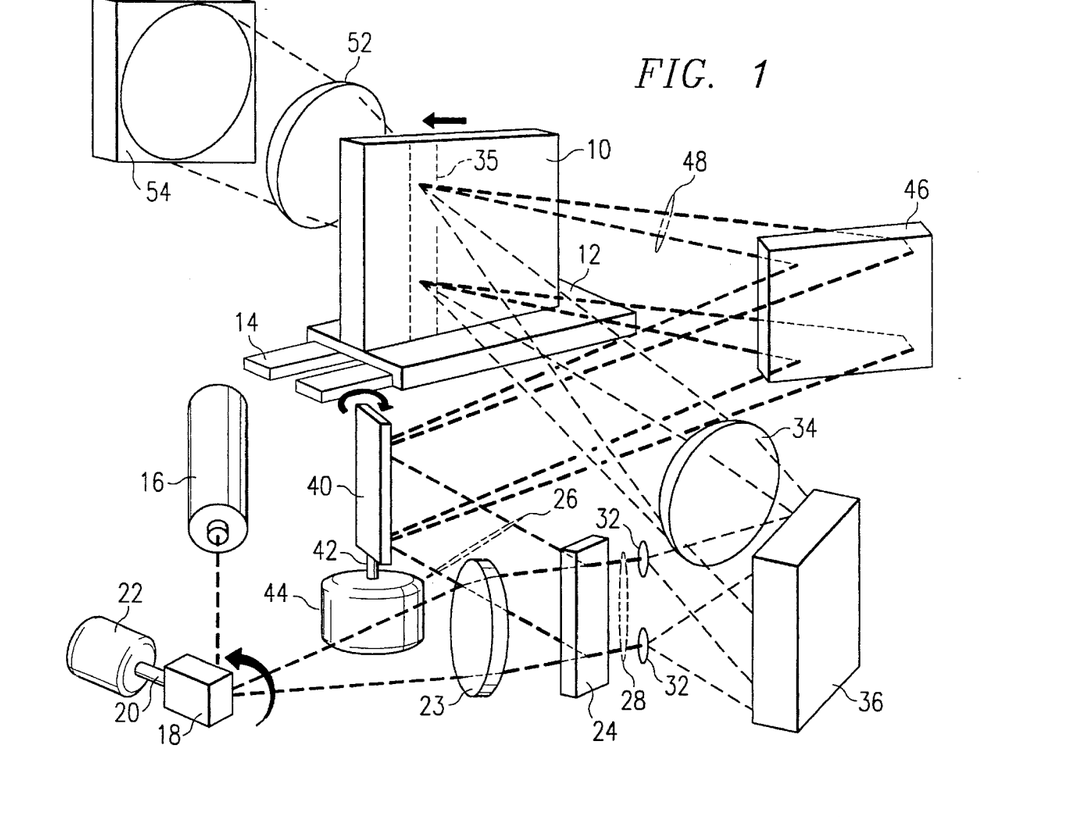
FIG. 1 illustrates a diagrammatic view of the positioning system and the associated optical paths of the present invention.

Referring now to FIG. 1, there is illustrated a layout for the preferred embodiment which is a compact holographic storage system for recording data on and retrieving data from a holographic storage media 10. As will be described hereinbelow, holographic storage media 10 is a structure formed from a photopolymer material. The system of FIG. 1 is constructed to fit within a standard 5¼" disk form factor and provide for a relatively large recording window on the order of 2"×2" in the holographic storage media 10. The holographic storage media 10 is in the form of a slide, such that it can accommodate a removable storage media. The storage media 10 is disposed within a carrier 12, the carrier 12 operable to be inserted into the system on a slide 14.

A laser 16 is provided, which can be comprised of, for example, a laser diode with a power output of around 30 milliwatts, with a wavelength in the range of 680 nanometers. The output of the laser 16 is a beam which is directed toward a reflective surface 18. The reflective surface 18 is connected via a shaft 20 to a stepper motor 22. The stepper motor 22, as will be described hereinbelow, is operable to provide beam positioning along the y-axis and, therefore, is referred to as the y-stepper motor 22. The beam reflected from the surface 18 is directed toward a lens 23 which is operable to direct each of the beam paths from the surface 18 in a parallel manner toward a beam splitter 24. The beam splitter 24 is operable to divide the beam up into a data beam 28 and a reference beam 26. The data beam 28, as will be described hereinbelow, is operable to have data superimposed thereon. The reference beam 26 is operable, during a record operation, to be directed toward a stack or recording site on the media where it interferes with the data beam 28 and, during the playback operation, to be directed to a stack or recording site on the surface of the storage media 10 for the purpose of reconstructing a recording.

The data beam 28 is directed toward a specific lens in an array 32 of individual lenses for each position of the y-stepper motor 22. Each of the small lenses in the array 32 is operable to expand the beam and direct it to the surface of a spatial light modulator 36. The spatial light modulator 36 is an array of elements, each representing a bit of information. The data is arranged in a "page" of data on a grid of, for example, 256×256 bits. Each of the bits is comprised of a rectangular image called a pixel that is either black or white. The SLM 36 in the embodiment of FIG. 1 is illustrated as a "reflective" polarization rotating SLM and, therefore, when light is reflected off an element, if the polarization of the light is not rotated, it is passed by an analyzer and is a "white" image and, whenever the polarization of the light is rotated during reflection off a pixel, this is not passed and is a "black" image. This represents the two binary states.

The reflected image is input to a transform lens 34, which is operable to focus the image onto the surface of the recording media 10. It is noted that for all positions of the stepper motor 22, a plurality of storage locations will be defined along a column 35 on the surface of the storage media 10, there being represented only two locations in the embodiment of FIG. 1.

The reference beam 26 is directed toward a reflective surface 40 which is longitudinal in shape and is connected through a shaft 42 to a stepper motor 44. The reflective surface 40 provides for angle multiplexing of multiple pages at a given stack and is operable to direct the angle multiplexed reference beam 26 at a predetermined angle to a Holographic Optical Element (HOE) 46, which is operable to direct each of the reference beam paths as a redirected reference beam 48 to a given stack location on the surface of the storage media 10. It can be seen that the angle of the redirected reference beams 48 is a function of the stepper motor 44, and the angle which is imposed thereon by the reflective surface 40.

During a record operation in a given storage location in a holographic storage media 10, the reference beams are separated by a Bragg angle, such that the images can be discriminated. Therefore, during the record operation, the y-stepper motor 22 positions, the reflective surface 18 at one position which results in the data beam being redirected to a given storage location on the surface of the recording media 10 at a location in the column 35. Data is then imposed on the data beam by the SLM 36 and then the stepper motor 44 positioned at a first angle. This will result in storage of that page of information onto the storage location. Thereafter, the SLM 36 is controlled to superimpose another page of information onto the data beam and then the stepper motor 44 "steps" to a different angle to record this new page of information in the same storage location. Each of these record operations is the result of the interference between the redirected reference beam 48 at a particular angle and the data beam. This results in the storage of an interference grating at that storage location. Each page is comprised of an interference grating, these interference gratings being overlapping within a storage region. Since each interference grating was stored by the interference of a data beam and a reference beam at a different angle, the reconstruction operation merely requires that a reference beam be redirected to the storage location at the angle at which the interference grating was stored.

During the data reconstruction, the data is output to an imaging lens 52, which is operable to then focus the expanded image onto a detector 54. The detector 54 is comprised of an array of detector elements such as a CCD.

Figure 1A:
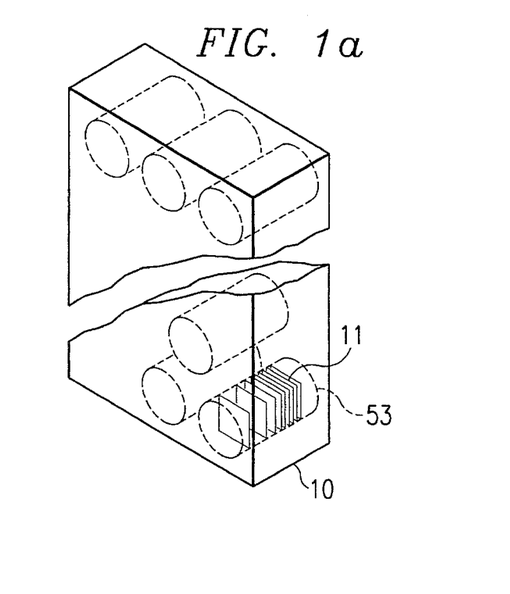
FIG. 1a illustrates a detail of the recording media.

Referring now to FIG. 1a, there is illustrated a perspective view of a holographic storage media 10. As described above, the holographic storage media can be divided into storage regions, which are illustrated by storage regions 53, each of which comprises a stack. Each of these stacks or storage regions 53 are separated by a predetermined distance and are each operable to store a plurality of pages of information, each of these pages of information represented by an interference grating. Each of the stacks 53 and separated by a predetermined distance and organized in an array.

Figure 2:
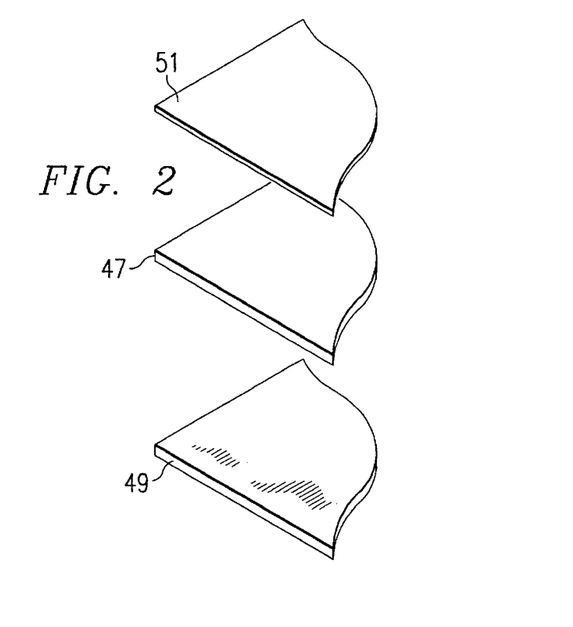
FIG. 2 illustrates an exploded view of the storage media.

Referring now to FIG. 2, them is illustrated an exploded view of one embodiment of the storage media 10. The storage media of FIG. 2 utilizes a photopolymer, which photopolymer is a material that undergoes photo-induced polymerization. These compositions have been used to form conventional holograms. These are typically fabricated from a viscous or gelatin-like composition which is photoreactive. When two laser beams intersect in this composition to set up an interference pattern, this causes selective polymerization within the material. These compositions typically contain a polymeric binder, a liquid ethylinically unsaturated monomer and a photoinitiator system. Typically, the layer 47 of viscous or gelatin-like recording material is spun or web coated onto a substrate 49, such as glass, to provide a thin coating of approximately 20 microns. A capping layer 51 of material such as Mylar® is then disposed over the gelatin layer. This provides a relatively good optical surface on the upper surface of the gelatin layer, and the glass substrate provides a high quality optical surface on the bottom surface of the gelatin-like recording layer.

Figure 3:
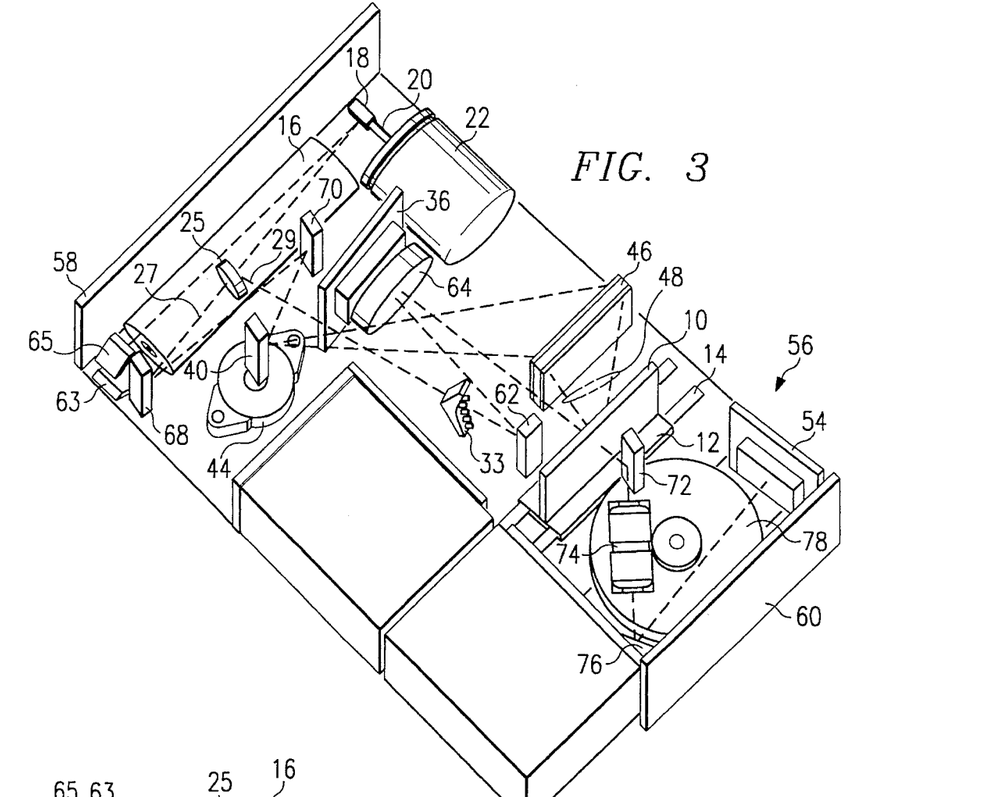
FIG. 3 illustrates a perspective view of the compact layout of the components within a housing.

Referring now to FIG. 3, there is illustrated a general layout of one embodiment of the present invention wherein the holographic storage system is compactly laid out to fit within the 5¼" disk form factor. In this embodiment, optical components of FIG. 1 are disposed in a housing 56 having a front edge 58 and a rear edge 60. The laser 16 is disposed proximate and parallel to the front edge 58. The output of laser 16 is redirected to the surface of the reflective surface 18 via two mirrors 63 and 65. The two mirrors 63 and 65 are disposed at a 45° angle with respect to each other, such that the beam is directed outward from the surface 63 up to the surface 65 and then above the laser along the longitudinal axis thereof to the reflective surface 18.

The new beam reflected off of the surface 18 is directed towards a beam splitter 25, similar to the beam splitter 24 in FIG. 1. However, the lens 23 is not present. Rather, the beam splitter 25 divides the beam into a data beam 29 and a reference beam 27, the data beam 29 being directed toward a lens array 33 which is comprised of a plurality of GRIN rods, which are cylindrical rods that are operable to expand the data beam and direct it toward a reflective surface 62.

Upon reflection and data modulation, the data beam again passes through a lens 64, similar to the lens 34. In the first pass through lens 64, it collimates the light striking the SLM and, in the second pass, the lens 64 acts as a transform lens similar to the transform lens 34. In effect, the lens 64 is first operable to convert the expanded beam from the reflecting surface 62 and the array 33 into a parallel beam that will impinge on the entire surface of the SLM 36. The reflected beam from the SLM 36 is then again focused by the lens 64, which then operates as a Fourier transforc lens, onto a specific storage location on the surface of the storage media 10.

The reference beam 27, which is similar to the reference beam 26, is directed toward a first reflective surface 68 for reflection to a second reflective surface 70. The reflective surface 70 again redirects the reference beam 27 to the surface of the reflective surface 40, which is operated by the stepper motor 44 to provide the angle multiplexing operation. This, as described above, then directs the beam toward the surface of the HOE 46.

During the data reconstruction operation, the reconstructed image is reflected from a surface 72 to an imaging lens 74, similar to the imaging lens 52, and then to a reflecting surface 76. This is then reflected to the surface of the detector 54.

A stack stepper motor 78 is provided proximate to the imaging lens 74 and the reflecting surface 72. The stepper motor 78 is operable to control the carrier 12 and move it in a reciprocal motion along the slide 14 to provide for the positioning of the stack, and allows a new column of storage locations to be selected on the surface of the media 10. Additionally, it can be seen that each of the reflective surfaces is substantially conforming to the shape of the column, i.e., longitudinal in shape. It is therefore only necessary to control the y-stepper motor 22 in such a manner to move the beam along the longitudinal axis of each of the reflective surfaces in order to move it along the longitudinal axis of the column 35 on the surface of the storage media 10.

Figure 4:
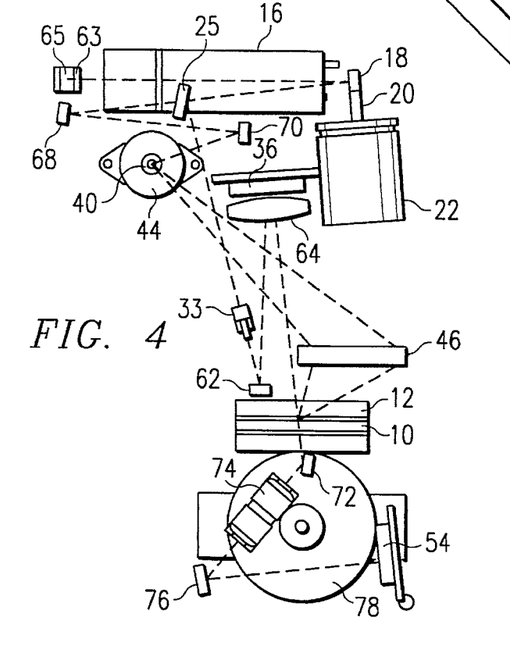
FIG. 4 illustrates a top view illustrating only the optics component of the embodiment of FIG. 3.

Referring now to FIG. 4, there is illustrated a top view of the layout of the optical components in the embodiment of FIG. 3.

Figures 5, 7:
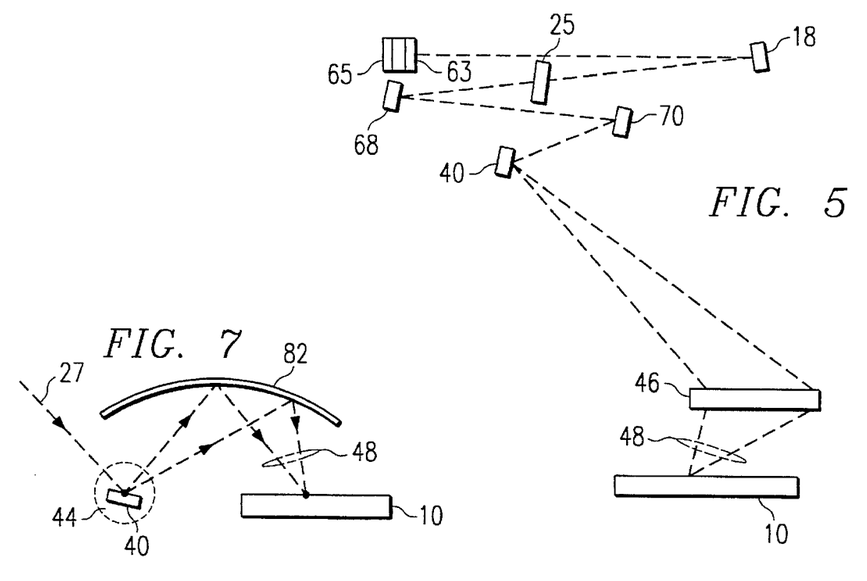
FIG. 5 illustrates a view of the light path utilized to define a reference beam on the surface of the holographic storage media.
FIG. 7 illustrates a top view of an alternate embodiment of the reference beam path wherein an elliptical mirror is substituted for the HOE.

Referring now to FIG. 5, there is illustrated a top view of the optical path for the reference beam. The beam, prior to splitting by the beam splitter 25, is directed from the mirror 65 a distance of approximately 2.54 inches to the reflective surface 18 associated with the y-stepper motor 22. This is then redirected from the reflective surface 18 to the beam splitter 25 along a distance of approximately 1.47". The reflective surface 68 is disposed approximately 1.06" from the beam splitter 25 and this is then reflected to the reflective surface 70 along a distance of approximately 1.54". The reflective surface 70 then redirects the beam along a distance of approximately 0.82" to the reflecting surface 40 which provides the angle multiplexing. The beam is then directed toward the HOE 46 along a distance of approximately 2.62 inches at the maximum, and then from the HOE 46 to the surface of the storage media 10, which is disposed at a distance of approximately 1.00 inches at the maximum.

Figure 6:
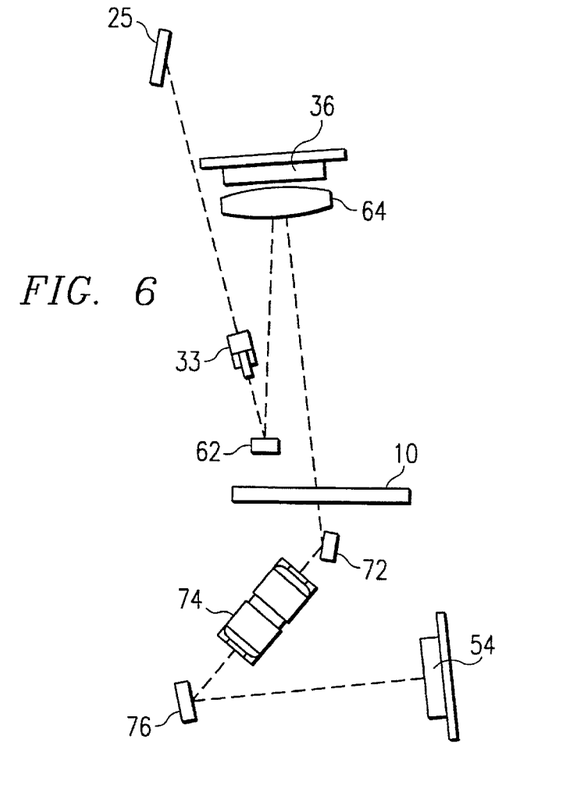
FIG. 6 illustrates the light path utilized to define a data beam during a record operation, and the path associated with the reconstructed data during playback operation.

Referring now to FIG. 6, there is illustrated a diagrammatic view of the optical path for the object beam, illustrating both the record operation and the data reconstruction operation. The data beam is directed from the beam splitter 25 a distance of approximately 1.8–1.93" to the lens array 33, the lens array 33 arranged along an arc, as illustrated in FIG. 3. The distance from the array 33 to the reflective surface 62 is approximately 0.56 inches, such that the data beam will travel a distance of 2.49" from the beam splitter 25 to the reflective surface 62. This will then be reflected a distance of approximately 1.37" to the transform lens 64 and then a distance of 0.26" to the surface of the SLM 36. The distance from the transform lens 64 to the storage media 10 is approximately 1.72" for a total of 1.9" from the SLM 36 to the surface of the storage media 10.

Following the data reconstruction operation, the reconstructed image will travel a distance of approximately 0.33" from the storage media 10 to the surface of the reflective surface 72 and then a distance of approximately 1.33 inches from the imaging lens 74 to the reflective surface 76. Reflective surfaces 72 and 76 are folding minors for the purpose of fitting the optics into the 5¼" form factor. This will then be redirected to the detector 54, which is disposed a distance of 1.55 inches therefrom.

Referring now to FIG. 7, there is illustrated an alternate embodiment of the optics system for redirecting the reflected reference beams from the surface of the reflective surface 40 to the surface of the storage media 10. An elliptical reflective surface 82 is provided which, since it is elliptical, has two foci. The reflective surface 40 is disposed at one of the foci and the media 10 surface is disposed at the other of the foci. Therefore, when the reference beam 27 is reflected from the surface of the reflective surface 40 to the elliptical reflective surface 82, it will be reflected from the elliptical surface 82 back to the other foci, which is the surface of the storage media 10. For all angles of the reflective surface 40, as determined by the stepper motor 44, the redirected reference beam 48 will always be redirected toward the storage location, with the only difference being the angle of incidence with respect thereto. Although not illustrated, the reflective surface 82 is elliptical in cross-section only, and so is a cylindrical optical mirror.

Figure 8:
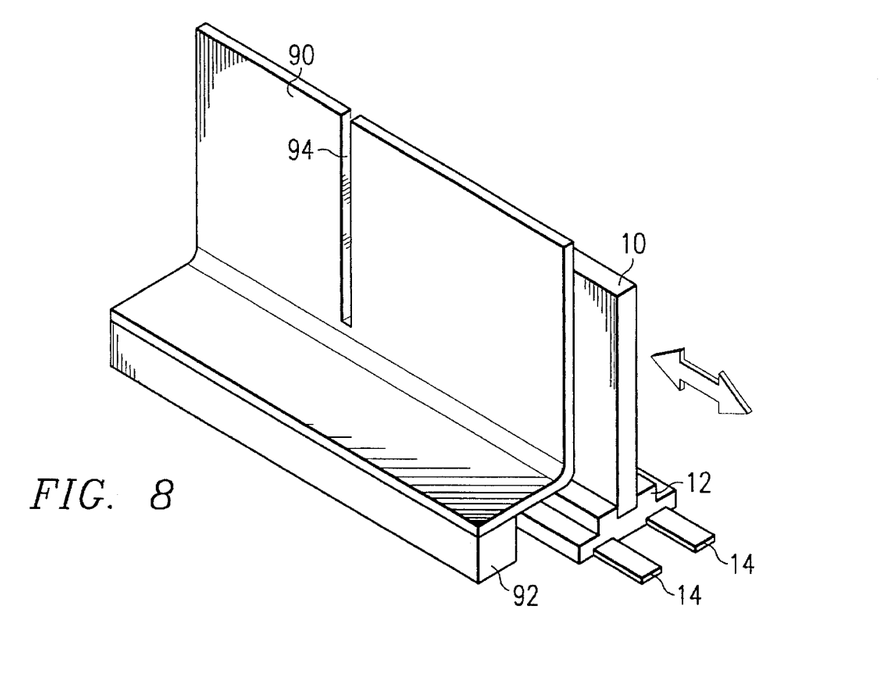
FIG. 8 illustrates a detail of a clipping slit.

Referring now to FIG. 8, there is illustrated a detail of clipping slit plate 90 that is mounted on a fixed block 92 in front of the slide 14, such that the rear surface of the clipping slit plate 90 is disposed in close proximity to the surface of the media 10. A slit 94 is disposed in the clipping slit plate 90 along the optical axis of the column 35 over which the data beam and reference beam are directed by the optics, as was described hereinabove with respect to FIGS. 1 and 3.

The slit 94 is approximately the same diameter as the storage regions within the media 10.

Figure 9A:
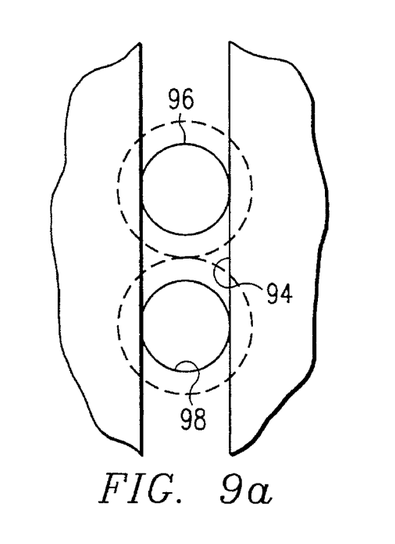
FIGS. 9a and 9b illustrate diagrammatic views of the clipping slit.
Figure 9B:
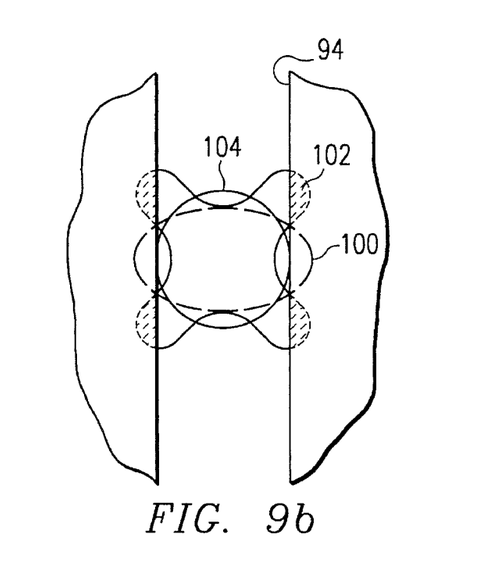

Referring now to FIGS. 9a and 9b, there is illustrated a detail of the slit 94. Two storage regions 96 and 98 are illustrated along a single one of the columns 35. The slit 94 is approximately 1 mm in width, the storage regions 96 and 98 also being approximately 1 mm in diameter. FIG. 9b illustrates the energy distribution of a reference beam pattern 100 and a data beam pattern 102 about a storage region 104 disposed in the slit 94. It can be seen that by disposing the slit 94 at a width substantially equal to the diameter of the storage region 104, a portion of the energy of the data beam outside the storage region 104 will be "clipped" and, as such, this energy will not "bleed" over into adjacent ones of the storage regions. This is due to the fact that, when a Fourier transform of data is recorded, the spatial intensity distribution at the transform point is a function of spatial frequency, with the higher spatial frequency components being further off axis. There is a maximum spatial frequency which must be recorded in order to recover the desired information in the data. However, there is often significant intensity in spatial frequency components above this frequency because of fine detail in the data image or irregularities in the SLM. This intensity or energy uselessly exposes the media and forces adjacent recording sites to be placed further apart than necessary. The slit 94, by "clipping" the higher spatial frequencies, allows for increased packing density.

In summary, there has been provided a holographic storage system for positioning a data beam and a reference beam in a particular storage location within a holographic storage media by the combination of movement of the storage media and movement of the data beam and reference beam. In the disclosed embodiment, the storage media is moved along one axis and the reference and data beams are moved along the other axis. By defining a column of storage cells within the storage media, it is then only necessary to move both the data beam and the reference beam to a particular location along the column. This requires movement of the output of a laser to a particular location along the y-axis. Thereafter, the angle of the reference beam is varied by an angle multiplexing system. This therefore requires the optic systems to only move along a single axis.

Although the preferred embodiment has been described in detail, it should be understood that various changes, substitutions and alterations can be made therein without departing from the spirit and scope of the invention as defined by the appended claims.

What is claimed is:

1. A positioning system for positioning a laser beam within a select storage region in a holographic storage media, comprising:

a first motive device for holding the holographic storage media and moving the surface thereof along a single and linear direction in the plane of the surface of the holographic storage media;

a first reflective surface for reflecting the laser beam to provide a once redirected beam;

a second motive device for rotating said first reflective surface about an axis on the surface thereof, the laser beam impinging upon said axis; and a collimating device for redirecting said once redirected beam toward the surface of the holographic storage media as a twice redirected beam such that all redirected positions of said twice redirected beam are substantially parallel to each other, the rotation of said first reflective surface causing said twice redirected beam to move along the surface of the holographic storage media in a path on the surface of the holographic storage media and at an angle to said single and linear direction through which said first motive device moves.

2. The positioning system of claim 1, wherein said first motive device moves in first discrete steps and said second motive device moves in second discrete steps.

3. The positioning system of Claim 1, wherein said collimating device is arranged such that said twice redirected beam moves along said path at an angle to said single and linear direction of said first motive device on the surface of the holographic storage media which is perpendicular to said single and linear direction.

4. The positioning system of Claim 1, wherein said twice redirected beam comprises a reference beam for a holographic recording operation and further comprising an angle multiplexing device for varying the angle of incidence of said twice redirected beam on the surface of the holographic storage media for the select storage region.

5. The positioning system of Claim 4, wherein said angle multiplexing device comprises:

a second reflective surface for reflecting said twice redirected beam to provide a thrice redirected beam;

a third motive device for rotating said second reflective surface about an axis along the surface thereof, the axis on the surface thereof oriented such that said twice redirected beam impinges thereon for all positions of said first reflective surface under the control of said first motive device; and a redirecting device for directing all angles of said thrice redirected beam from a given location along the axis on said second reflective surface to the select storage location in the holographic storage media as an angle multiplexed reference beam.

6. The positioning system of Claim 4, and further comprising:

a beam splitter for splitting off at a different angle a portion of said second redirected beam to provide a data beam;

a spatial light modulator for superimposing data onto said data beam;

data beam directing optics for redirecting said data beam with data superimposed thereon to the select storage region to interfere with said reference beam during a record operation; and a transform lens for focusing said redirected data beam within the select storage region.

7. The positioning system of Claim 6, wherein the select storage region has a predetermined diameter and further comprising a masking device for masking off a portion of the holographic storage media that lies outside of the select storage region such that illumination provided by said data beam to areas of the holographic storage media outside of the select storage region are masked off.

8. The positioning system of Claim 7, wherein said masking device is a slit having a dimension substantially equal to the average diameter of the select storage region and having a longitudinal axis oriented along the path of said twice redirected beam as directed by the rotation of said first reflective surface.

9. The positioning system of Claim 4, and further comprising a detector for detecting data in a reconstructed image generated when an interference grating is stored within the select storage region under conditions corresponding to the position and angle of said reference beam.

10. The positioning system of Claim 1, and further comprising a light masking device for masking off a predetermined portion of said twice redirected beam prior to said twice redirected beam impinging upon the surface the holographic storage media.

11. The positioning system of Claim 10, wherein said masking device is a slit having a dimension substantially equal to the average diameter of the select storage region and having a longitudinal axis oriented along the path of said twice redirected beam as directed by the rotation of said first reflective surface.

12. A positioning system for positioning a laser beam within a select storage region in a holographic storage media, comprising:

- a first motive device for holding the holographic storage media and moving the surface thereof along a single and linear direction in the plane of the surface of the holographic storage media;
- a first reflective surface for reflecting the laser beam to provide a once redirected beam;
- a second motive device for rotating said first reflective surface about an axis on the surface thereof, the laser beam impinging upon said axis;
- a collimating device for redirecting said once redirected beam toward the surface of the holographic storage media as a reference beam such that all redirected positions of said reference beam are substantially parallel to each other, the rotation of said first reflective surface causing said reference beam to move along the surface of the holographic storage media in a path on the surface of the holographic storage media and at an angle to said single and linear direction through which said first motive device moves;
- a second reflective surface for reflecting said reference beam to provide a thrice redirected beam;
- a third motive device for rotating said second reflective surface about an axis along the surface thereof, the axis on the surface thereof oriented such that said thrice-redirected beam impinges thereon for all positions of said first reflective surface under the control of said first motive device; and
- a redirecting device for directing all angles of said thrice redirected beam from a given location along the axis on said second reflective surface to the select storage location in the holographic storage media as an angle multiplexed reference beam, said redirecting device comprising a cylindrical elliptical mirror having two foci, one disposed along the rotational surface on said second reflecting surface and the other disposed on the surface of the holographic storage media at said given location.

* * * * *

UNITED STATES PATENT AND TRADEMARK OFFICE
CERTIFICATE OF CORRECTION

PATENT NO. : 5,621,549
DATED : April 15, 1997
INVENTOR(S) : Redfield

It is certified that error appears in the above-identified patent and that said Letters Patent is hereby corrected as shown below:

<u>Column 4</u>,
Line 17, replace "positions" with -- positions, --

<u>Column 6</u>,
Line 36, replace "surface 72" with -- surface 72, --

Signed and Sealed this

Twenty-third Day of April, 2002

Attest:

Attesting Officer

JAMES E. ROGAN
*Director of the United States Patent and Trademark Office*